United States Patent
Ohtake et al.

(10) Patent No.: US 8,583,825 B2
(45) Date of Patent: Nov. 12, 2013

(54) DEVICE INFORMATION ACQUISITION APPARATUS AND DEVICE INFORMATION ACQUISITION PROGRAM

(75) Inventors: Mitsuo Ohtake, Kanagawa (JP); Shohhei Yamamoto, Tokyo (JP); Satoshi Tomizawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1409 days.

(21) Appl. No.: 11/668,823

(22) Filed: Jan. 30, 2007

(65) Prior Publication Data

US 2007/0199069 A1    Aug. 23, 2007

(30) Foreign Application Priority Data

Feb. 14, 2006  (JP) ................ 2006-036552

(51) Int. Cl.
*G06F 15/16*    (2006.01)

(52) U.S. Cl.
USPC ........... 709/245; 709/206; 709/201; 709/222; 709/224; 709/202; 370/241; 370/254; 702/186

(58) Field of Classification Search
USPC ....................................................... 709/254
See application file for complete search history.

(56) References Cited

U.S. PATENT DOCUMENTS

| | | | | |
|---|---|---|---|---|
| 6,611,863 B1* | 8/2003 | Banginwar | .............. | 709/220 |
| 6,981,036 B1* | 12/2005 | Hamada | .............. | 709/223 |
| 2002/0078076 A1* | 6/2002 | Evans | .............. | 707/204 |
| 2003/0046144 A1 | 3/2003 | Clark et al. | | |
| 2004/0098715 A1* | 5/2004 | Aghera et al. | .............. | 717/173 |
| 2005/0071444 A1* | 3/2005 | Motoyama | .............. | 709/223 |
| 2006/0221977 A1* | 10/2006 | Basso et al. | .............. | 370/395.32 |
| 2008/0196098 A1* | 8/2008 | Cottrell et al. | .............. | 726/12 |

FOREIGN PATENT DOCUMENTS

| | | |
|---|---|---|
| EP | 1 059 766 A2 | 12/2000 |
| EP | 1 429 238 A2 | 6/2004 |
| EP | 1 519 513 A1 | 3/2005 |
| JP | 2001-249881 A | 9/2001 |
| JP | 2001-318843 | 11/2001 |
| JP | 2003-178017 A | 6/2003 |
| JP | 2004-213110 | 7/2004 |
| JP | 2006-85487 | 3/2006 |

OTHER PUBLICATIONS

Office Action issued Feb. 15, 2011, in Japanese Patent Application No. 2006-036552.

* cited by examiner

*Primary Examiner* — Jude Jean Gilles
*Assistant Examiner* — Jaren M Means
(74) *Attorney, Agent, or Firm* — Oblon, Spivak, McClelland, Maier & Neustadt, L.L.P.

(57) ABSTRACT

A disclosed portable apparatus is connectable to a client terminal connected to a network and has a program stored therein for causing the client terminal to function as a device information acquisition unit and an analysis unit. The device information acquisition unit is configured to obtain operational information on a device that is assigned a network address and connected to the network, and the analysis unit is configured to delete at least a part of information on the network address which information is obtained together with the operational information, to analyze the obtained operational information, and to output results of the analysis of the operational information.

12 Claims, 14 Drawing Sheets

FIG.4
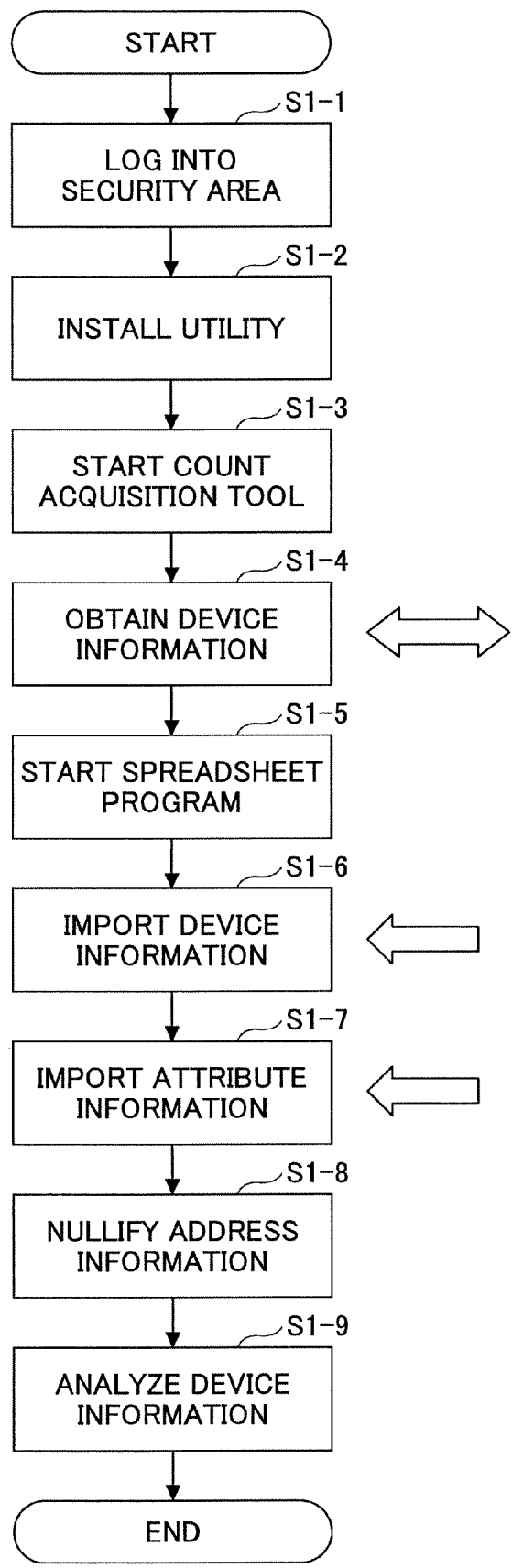
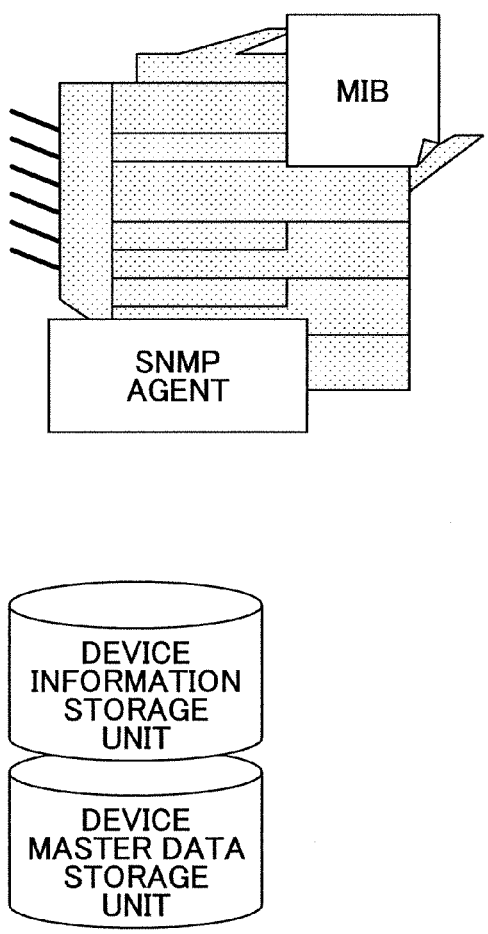

FIG.11

| | | | | | |
|---|---|---|---|---|---|
| NULLIFY IP ADDRESSES | | | | | |
| ADDRESS | MODEL NAME | VENDOR NAME | TOTAL COUNT | RECOMMENDED NUMBER OF PAGES | ... |
| ⋮ | ⋮ | ⋮ | ⋮ | ⋮ | |

| ADDRESS | MODEL NAME | VENDOR NAME | NUMBER OF MONTHS IN SERVICE | ... |
|---|---|---|---|---|
| ⋮ | ⋮ | ⋮ | ⋮ | ⋮ |

FIG.12

| ADDRESS | MODEL NAME | VENDOR NAME | TOTAL COUNT | RECOMMENDED NUMBER OF PAGES | BLACK-AND-WHITE PRINTING COST PER PAGE | BLACK-AND-WHITE PRINTING COST PER PAGE OBTAINED BY INTERVIEW | COLOR PRINTING COST PER PAGE | COLOR PRINTING COST PER PAGE OBTAINED BY INTERVIEW | PAPER COST PER SHEET OBTAINED BY INTERVIEW | RELEASE MONTH AND YEAR | MONTH AND YEAR OF PURCHASE OBTAINED BY INTERVIEW |
|---|---|---|---|---|---|---|---|---|---|---|---|
| 123.456.105.119 | IM123 | R | 17676 | 25000 | 7.00 | | 34.00 | | | 2003/09 | |
| 123.456.105.789 | IP123123 | R | 2345 | 50000 | 3.00 | | 25.00 | | | 1999/03 | |
| ... | ... | ... | ... | ... | ... | | ... | | | | |

| ADDRESS | MODEL NAME | VENDOR NAME | NUMBER OF MONTHS IN SERVICE | ESTIMATED NUMBER OF PAGES PRINTED PER MONTH | BLACK-AND-WHITE PRINTING COST PER PAGE | BLACK-AND-WHITE PRINTING COST PER PAGE OBTAINED BY INTERVIEW | COLOR PRINTING COST PER PAGE | COLOR PRINTING COST PER PAGE OBTAINED BY INTERVIEW | PAPER COST PER SHEET OBTAINED BY INTERVIEW | PERCENTAGE OF BLACK-AND-WHITE PAGES | PERCENTAGE OF COLOR PAGES | CURRENT NUMBER OF BLACK-AND-WHITE PAGES PRINTED | CURRENT NUMBER OF COLOR PAGES PRINTED | CURRENT BLACK-AND-WHITE PRINTING COST | CURRENT COLOR PRINTING COST | CURRENT TOTAL COST |
|---|---|---|---|---|---|---|---|---|---|---|---|---|---|---|---|---|
| 123.456.105.119 | IM123 | R | 17676 | 25000 | 7.00 | | 34.00 | | | | | | | | | |
| 123.456.105.789 | P123123 | R | 2345 | 50000 | 3.00 | | 25.00 | | | | | | | | | |
| ... | ... | ... | ... | ... | ... | | ... | | | | | | | | | |

620

DEVICE INFORMATION ACQUISITION APPARATUS AND DEVICE INFORMATION ACQUISITION PROGRAM

BACKGROUND OF THE INVENTION

1. Field of the Invention

The present invention generally relates to a technology for obtaining operational information on devices connected to a network.

2. Description of the Related Art

In recent years, total cost of ownership (TCO) has been a keyword in reducing costs incurred relating to the ownership of devices. For example, the TCO of electronic devices, for example, image forming apparatuses such as copiers and printers, can be calculated by obtaining information including the purchase prices of the image forming apparatuses and the number of pages printed and thereby obtaining the running costs incurred by expendable supplies such as toner and paper.

To obtain running costs of electronic devices used by a client, it is necessary to obtain the operational information on the electronic devices. Such operational information is normally obtained by visiting the site where the electronic devices are installed.

Also, with the advancement of computer technologies, it has become possible to obtain the operational information on electronic devices via a network (see, for example, patent documents 1 and 2). Technologies disclosed in the patent documents 1 and 2 provide a program, apparatus, or system that is simply configured and makes it possible to monitor multifunction image forming apparatuses connected to a LAN by using a general-purpose network and existing facilities. In the disclosed technologies, the simple network management protocol (SNMP) is used for monitoring the multifunction image forming apparatuses. SNMP is a network management protocol. A network management model using SNMP includes a management apparatus called an SNMP manager and SNMP agents provided in devices to be managed by the SNMP manager. The SNMP manager sends requests to the SNMP agents and the SNMP agents return information requested. An SNMP agent in an SNMP-enabled device retains a management information base (MIB) that is management information on the SNMP-enabled device itself. Information items contained in the MIB are assigned standardized numbers called object identifiers (OID). The SNMP manager sends a request with OIDs specified to the SNMP agent and thereby obtains information from the SNMP agent.

[Patent document 1] Japanese Patent Application Publication No. 2004-213110 (page 1)

[Patent document 2] Japanese Patent Application Publication No. 2001-318843 (page 1)

It is preferable to make the process of obtaining a total cost of ownership as efficient as possible. When multiple devices are used in an office of a client (client's office), it is troublesome and time-consuming to go around in the client's office to obtain the information on the devices.

On the other hand, when obtaining operational information of devices via a network of the client, it is necessary to connect a computer for obtaining the operational information on the devices to the network. However, it is troublesome to configure the network settings of the computer each time to obtain the operational information of devices. Also, for security reasons, it is not desirable to connect a computer of an outsider to a corporate network.

Further, operational information of devices of a client must be managed with the greatest possible care.

SUMMARY OF THE INVENTION

The present invention provides a device information acquisition apparatus and a device information acquisition program that substantially obviate one or more problems caused by the limitations and disadvantages of the related art.

Embodiments of the present invention provide a device information acquisition apparatus and a device information acquisition program that make it possible to efficiently obtain operational information on devices connected to a network in an office of a client, thereby to calculate a total cost of ownership of the devices, and to adequately manage the obtained operational information.

An embodiment of the present invention provides a portable apparatus that is connectable to a client terminal connected to a network and has a program stored therein for causing the client terminal to function as a device information acquisition unit and an analysis unit, wherein the device information acquisition unit is configured to obtain operational information on a device that is assigned a network address and connected to the network; and the analysis unit is configured to delete at least a part of information on the network address assigned to the device which information is obtained together with the operational information, to analyze the obtained operational information, and to output the results of the analysis of the operational information.

Another embodiment of the present invention provides a portable apparatus having a program stored therein for causing a client terminal connected to a network to obtain and analyze operational information on a device that is assigned a network address and connected to the network. The program includes a device information acquisition code unit configured to cause the client terminal to obtain the operational information on the device; and an analysis code unit configured to cause the client terminal to delete at least a part of information on the network address assigned to the device which information is obtained together with the operational information, to analyze the operational information, and to output the results of the analysis of the operational information.

BRIEF DESCRIPTION OF THE DRAWINGS

FIG. 4 is a drawing illustrating an exemplary process of obtaining and analyzing information on a device according to an embodiment of the present invention;

FIG. 11 is a drawing illustrating a screen that shows details of usage status of a device;

FIG. 12 shows an exemplary network connection status table;

FIG. 13 shows an exemplary cost status table;

DESCRIPTION OF THE PREFERRED EMBODIMENTS

Preferred embodiments of the present invention are described below with reference to the accompanying drawings.

An embodiment of the present invention is described below with reference to FIGS. 1 through 14. In this embodiment, a USB memory and a client terminal are used to obtain information on network devices connected to a network. For example, a service person visits a client's office with a USB memory, obtains information on image processing apparatuses 30 (hereafter, may be referred to just as devices or network devices) connected to a local area network (LAN) of the client, and analyzes the obtained information to optimize the use of the image processing apparatuses 30.

Some of the image forming apparatuses 30 are SNMP-enabled and each of the SNMP-enabled image forming apparatuses 30 has an MIB containing its operational information. In this embodiment, it is assumed that an MIB contains a vendor name indicating the manufacturer of the corresponding image forming apparatus 30, a model name used as a model identifier, a MAC address or a media access control address, and a serial number. Also, an MIB contains a total count indicating the number of pages printed by the corresponding image forming apparatus 30. The total count is the sum of the number of pages printed (print count) using the print function, the number of pages copied (copy count) using the copy function, and the number of pages output (fax count) using the facsimile function.

Figure 1:
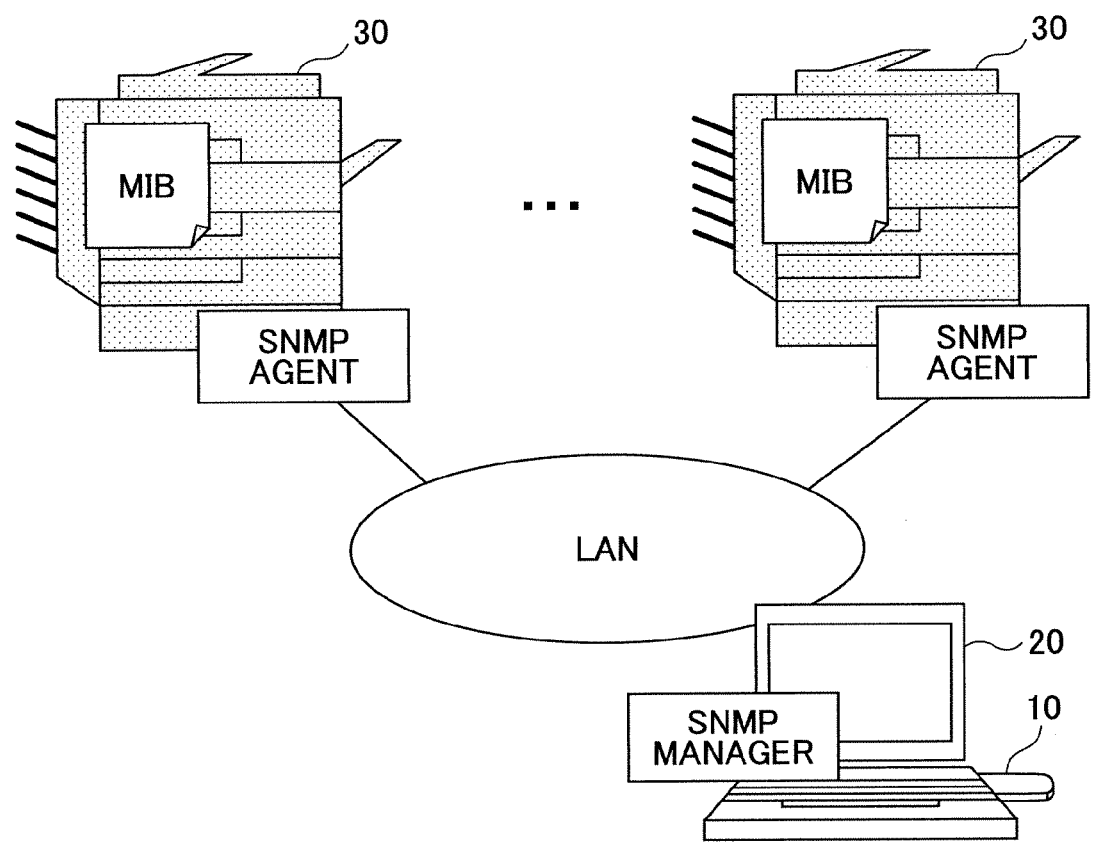
FIG. 1 is a schematic diagram of an exemplary system according to an embodiment of the present invention.
Figure 2:
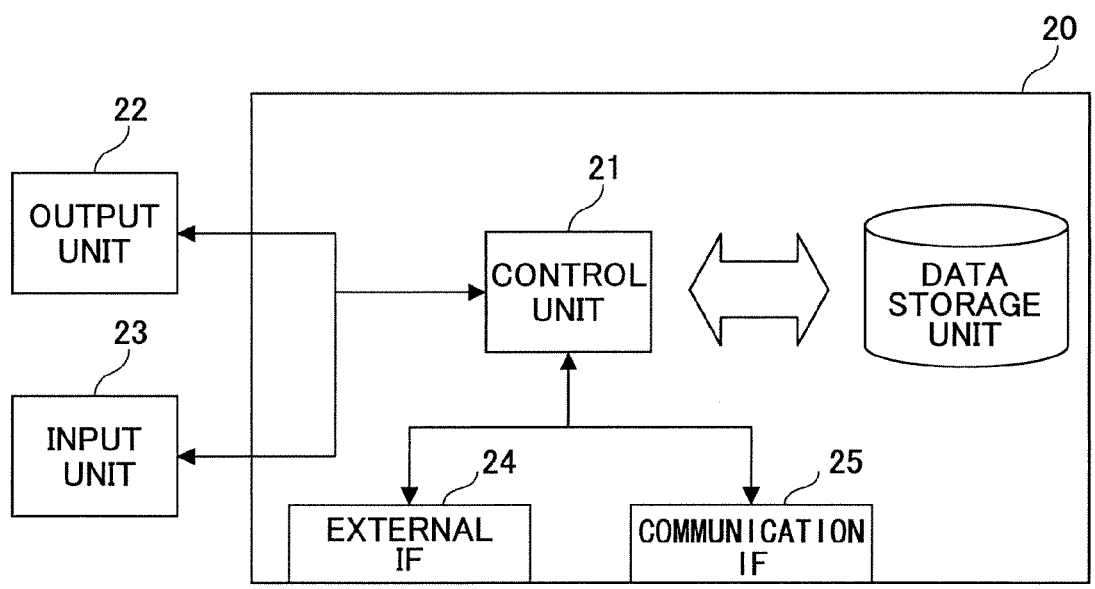
FIG. 2 is a block diagram illustrating an exemplary functional configuration of an exemplary client terminal according to an embodiment of the present invention.

An SNMP manager in a client terminal 20 is used to obtain information in MIBs. The client terminal 20 is a computer in the client's office. As shown in FIG. 2, the client terminal 20 includes a control unit 21, an output unit 22 such as a display, and an input unit 23 including, for example, a keyboard and a pointing device.

The control unit 21 includes a CPU and a storage unit (such as a RAM or a ROM) and communicates with network devices via a network. Also, the control unit 21 performs, for example, a step of obtaining operational information, a step of deleting a part of address information, a step of storing the obtained operational information, and a step of analyzing the operational information. The control unit 21 performs the above steps by executing a device information acquisition program and thereby functions, for example, as a device information acquisition unit, an analysis unit, and an obtained operational information storing unit.

The client terminal 20 also includes an external interface 24 and a communication interface 25. The external interface 24 is used to connect a USB memory 10. The communication interface 25 communicates with network devices via a local area network. The client terminal 20 further includes a data storage unit such as a hard disk drive. A spreadsheet program described later is stored in the data storage unit.

Figure 3:
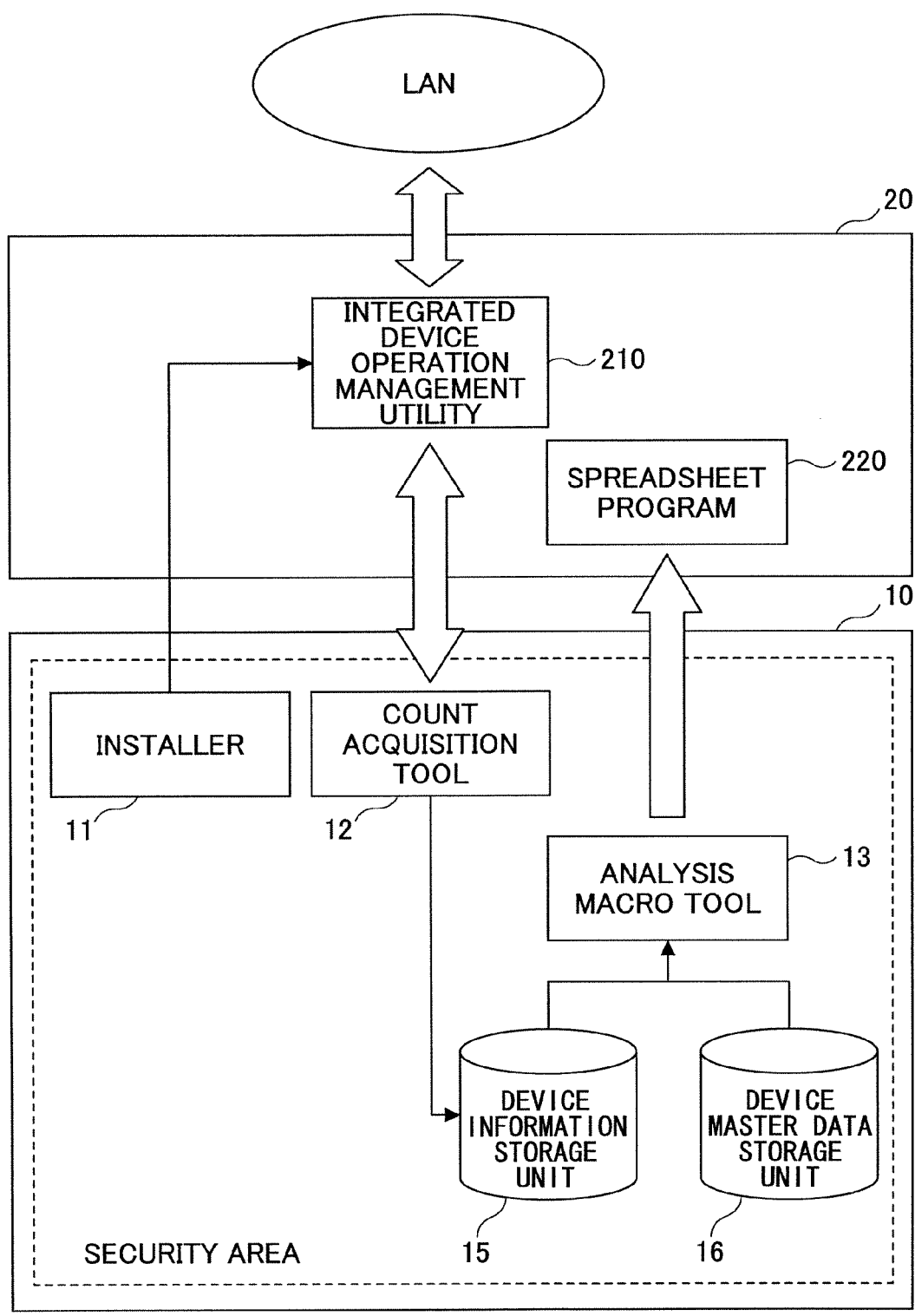
FIG. 3 is a block diagram illustrating exemplary functional configurations of the exemplary client terminal and an exemplary USB memory according to an embodiment of the present invention.

As shown in FIG. 3, the USB memory 10 contains an installer 11, a count acquisition tool 12, and an analysis macro tool 13. The installer 11 is used to install an integrated device operation management utility 210 into the client terminal 20.

The integrated device operation management utility 210 runs on the client terminal 20 and functions as an SNMP manager.

The count acquisition tool 12 is an application program for sending/receiving data to/from the integrated device operation management utility 210. The count acquisition tool 12 and the integrated device operation management utility 210 function together as a device information acquisition unit. The count acquisition tool 12 obtains information on network devices connected to a LAN from the integrated device operation management utility 210 and stores the obtained information in a device information storage unit 15 of the USB memory 10.

The USB memory 10 also includes a device master data storage unit 16. The device master data storage unit 16 contains master data on network devices available in the market. For example, the master data includes attribute information of each of the network devices and the attribute information is associated with the model name of the corresponding network device. The attribute information includes items such as recommended number of pages, black-and-white printing cost per page, color printing cost per page, release month and year, percentage of black-and-white pages, and percentage of color pages.

The analysis macro tool 13 is a program that runs on the spreadsheet program 220. The analysis macro tool 13 performs various calculations in conjunction with the spreadsheet program 220 executed by the control unit 21 of the client terminal 20 and thereby functions as an analysis unit.

Figure 5:
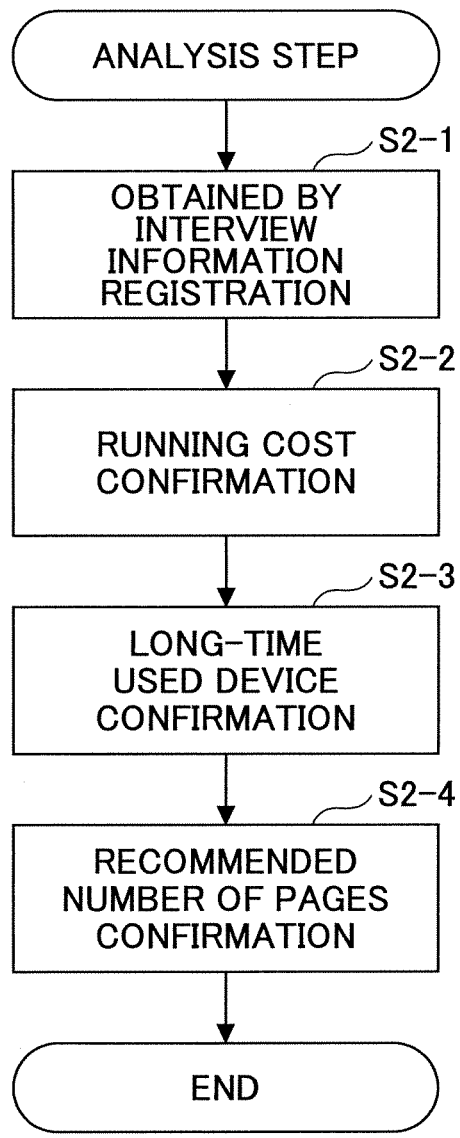
FIG. 5 is a drawing illustrating an exemplary process of analyzing obtained information on a device according to an embodiment of the present invention.

An exemplary process of obtaining and analyzing information on network devices using the above described system is described below with reference to FIGS. 4 and 5.

Figure 6:
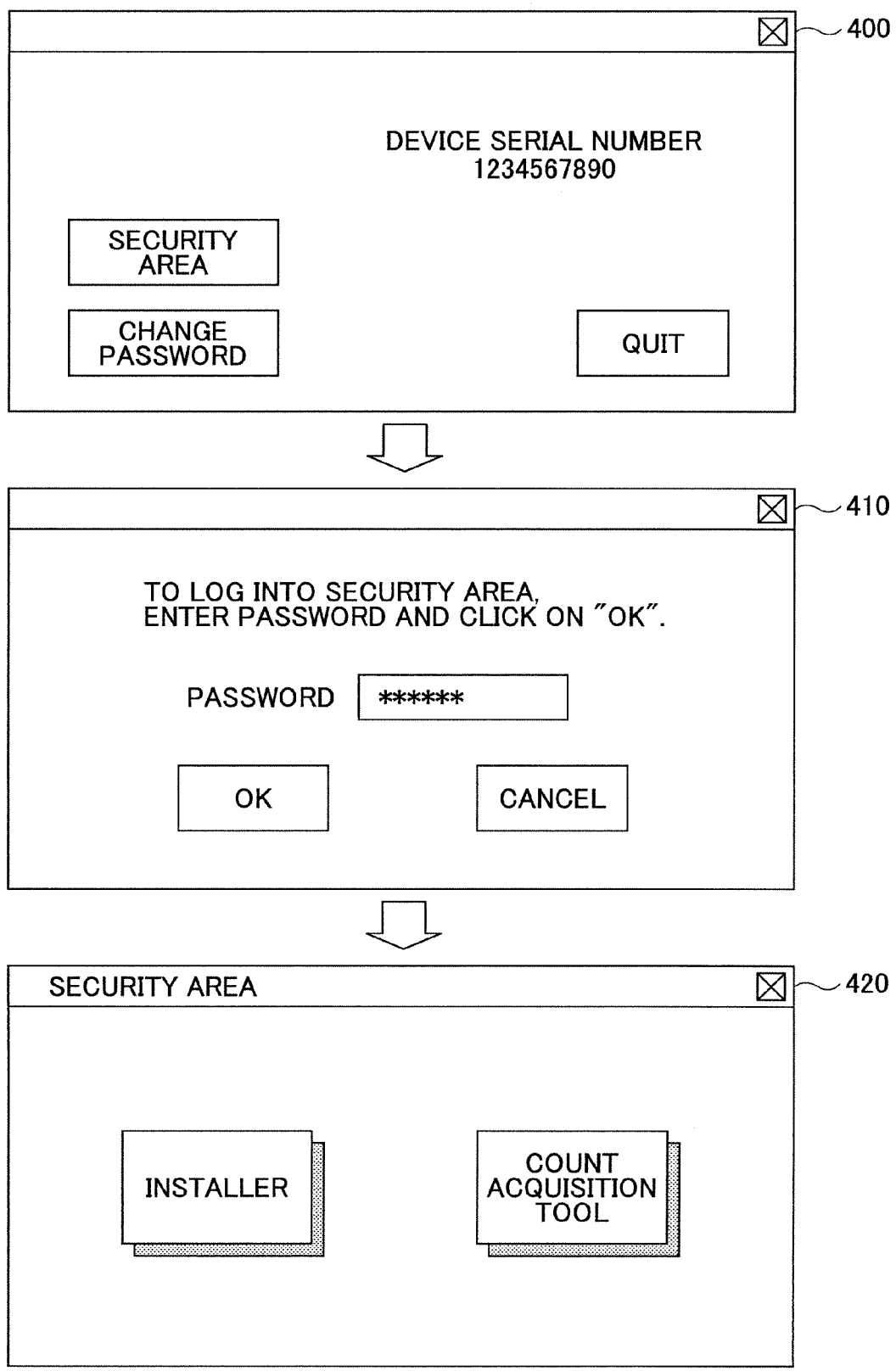
FIG. 6 is a drawing illustrating exemplary screens displayed on the exemplary client terminal.

First, the USB memory 10 is connected to the external interface 24 of the client terminal 20. Then, an authentication step (step S1-1) for logging into a security area of the USB memory 10 is performed. More specifically, when detecting the connection of the USB memory 10, the control unit 21 of the client terminal 20 outputs a screen 400 shown in FIG. 6 to the output unit 22. Then, the "Security area" button on the screen 400 is clicked on and a screen 410 shown in FIG. 6 is output to the output unit 22. The "Password" entry field is provided on the screen 410. A specified password is entered in the "Password" entry field and the "OK" button is clicked. The control unit 21 of the client terminal 20 compares the entered password and a password retained in the USB memory 10.

When the passwords match, the control unit 21 authorizes the access to the security area in the USB memory 10 and outputs a screen 420 shown in FIG. 6. The screen 420 includes launch buttons for the application programs stored in the USB memory 10. The "Installer" launch button on the screen 420 is clicked on and the installer 11 stored in the USB memory 10 installs the integrated device operation management utility 210 into the client terminal 20 (step S1-2).

Next, the "Count acquisition tool" launch button on the screen 420 is clicked on and the count acquisition tool 12 stored in the USB memory 10 is started (step S1-3).

Figure 7:
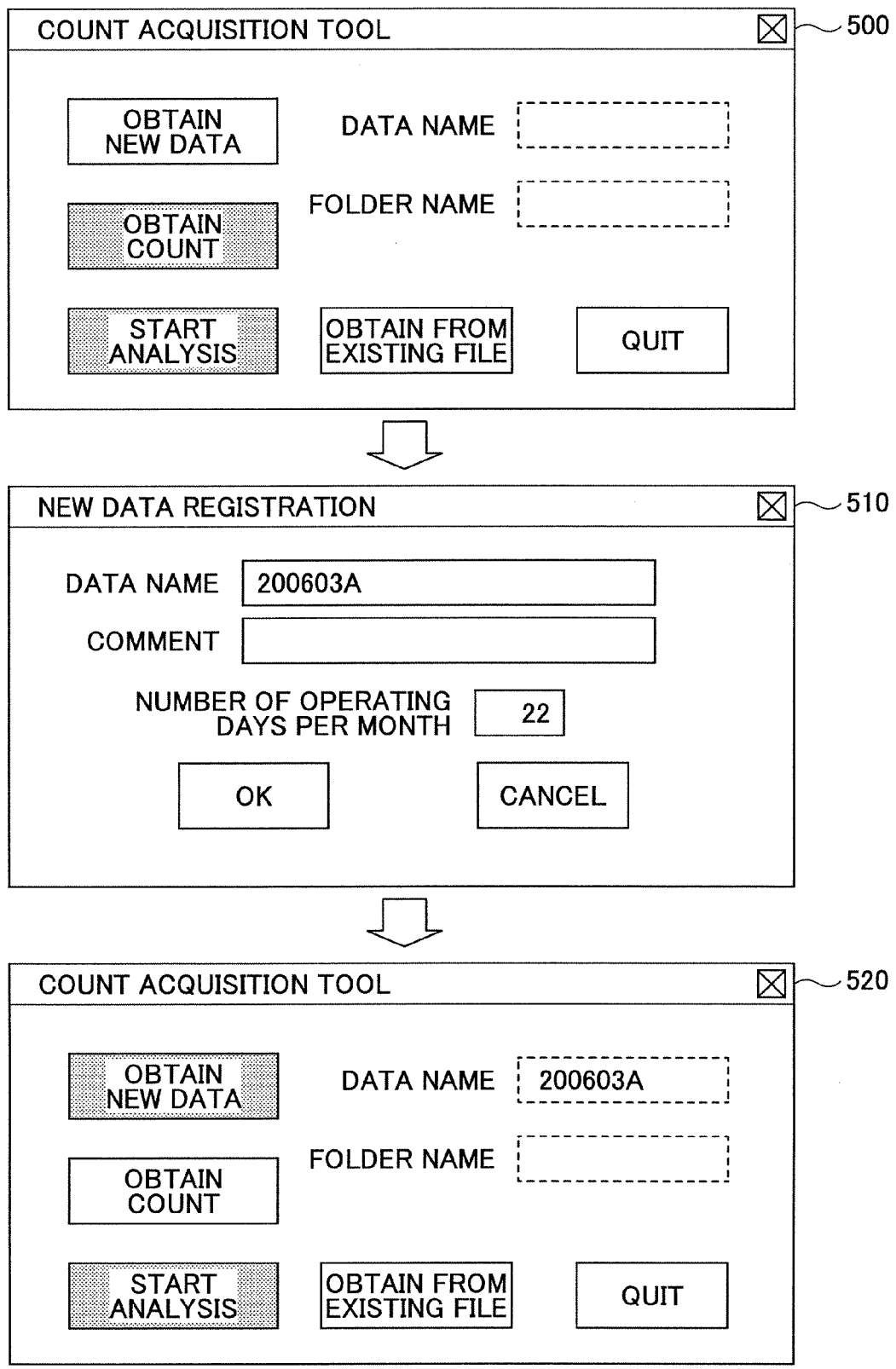
FIG. 7 is a drawing illustrating exemplary screens displayed on the exemplary client terminal.

When the count acquisition tool 12 is started, the client terminal 20 outputs a screen 500 shown in FIG. 7 to the output unit 22. The screen 500 includes the "Obtain new data" button, the "Obtain count" button, the "Start analysis" button, the "Obtain from existing file" button, and the "Quit," button. In this exemplary process, the "Obtain new data" button is clicked on to generate new data. Meanwhile, to reanalyze existing data, the "Obtain from existing file" button is used. When the "Obtain new data" button is clicked on, a screen 510 shown in FIG. 7 is output to the output unit 22. The screen 510 includes the "Data name" entry field, the "Comment" entry field, and the "Number of operating days per month" entry field. The "Data name" entry field is used to enter a file name of generated data. The "Comment" entry field is used to enter comments when necessary and the "Number of operating days per month" entry field is used to enter the number of operating days per month. After necessary information is entered in the entry fields, the "OK" button is clicked on.

When the "OK" button is clicked on, a screen 520 shown in FIG. 7 is output to the output unit 22. On the screen 520, the data name entered on the screen 510 is displayed.

Next, the "Obtain count" button on the screen 520 is clicked on. When the "Obtain count" button is clicked on, the control unit 20 starts the integrated device operation management utility 210 installed in the client terminal 20 and outputs a screen 530 shown in FIG. 8 to the output unit 22. The screen 530 is an entry screen used to set up conditions for searching for and monitoring target network devices. The range of network addresses to be searched is obtained by interviewing the client.

When searching for network devices in the same network segment as that of the client terminal 20, the "Local network" check box on the screen 530 is selected and specification of other conditions is not necessary. In this case, network devices are searched for within the IP address range identified by a subnet mask.

Also, IP addresses can be specified one by one by entering each of the IP addresses in the "Address" entry field on the screen 530 and clicking on the "Add" button. When the "Add" button is clicked on, the entered IP address is added to the list box on the right side. In this case, network devices with the IP addresses shown in the list box are searched for.

When also searching for network devices in other network segments, the "Range specification" check box is selected. To add a network segment, a start address and an end address are entered in the "Start address" and "End address" entry fields, respectively. When the "Add" button is clicked on, the entered IP address range is added to the list box on the right side. In this case, network devices are searched for within the IP address ranges shown in the list box. After the conditions are set up on the screen 530, the "OK" button is clicked on.

When the "OK" button is clicked, the count acquisition tool 12 obtains information on the image forming apparatuses 30 (step S1-4). More specifically, the SNMP manager implemented by the integrated device operation management utility 210 obtains the information on the network devices having IP addresses specified on the screen 530. Here, it is assumed that IP address ranges are specified. In this case, the SNMP manager sends ping packets to the LAN and receives responses from network devices connected to the LAN. Based on the responses, the SNMP manager obtains and lists the IP addresses of network devices in operation, and stores the IP address list in the device information storage unit 15.

Then, the SNMP manager sends a request with OIDs specified to each of IP addresses that are in the obtained IP address list and also in the specified IP address ranges to obtain information in the corresponding MIB (MIB information). When receiving the request, the SNMP agent of each of SNMP-enabled network devices returns a response containing the MIB information. The MIB information includes a vendor name, a model name, and a total count.

The count acquisition tool 12 obtains the MIB information of the SNMP-enabled network devices from the SNMP manager and stores the MIB information in the device information storage unit 15.

Figure 8:
FIG. 8 is a drawing illustrating exemplary screens displayed on the exemplary client terminal.

After the IP addresses and the MIB information (device information) are obtained, a screen 540 shown in FIG. 8 is output to the output unit 22 of the client terminal 20. Then, the "Start analysis" button on the screen 540 is clicked on to start the analysis of the device information. When the "Start analysis" button is clicked on, the control unit 21 of the client terminal 20 starts the spreadsheet program 220 (step S1-5).

The spreadsheet program 220 performs various calculations in conjunction with the analysis macro tool 13. More specifically, the control unit 21 imports the device information stored in the device information storage unit 15 into the spreadsheet program 220 (step S1-6).

The control unit 21 compares the model names in the MIB information in the device information with the model names in the device master data stored in the device master data storage unit 16 and imports the attribute information with matching model names into the spreadsheet program 220 (step S1-7).

Figure 9:
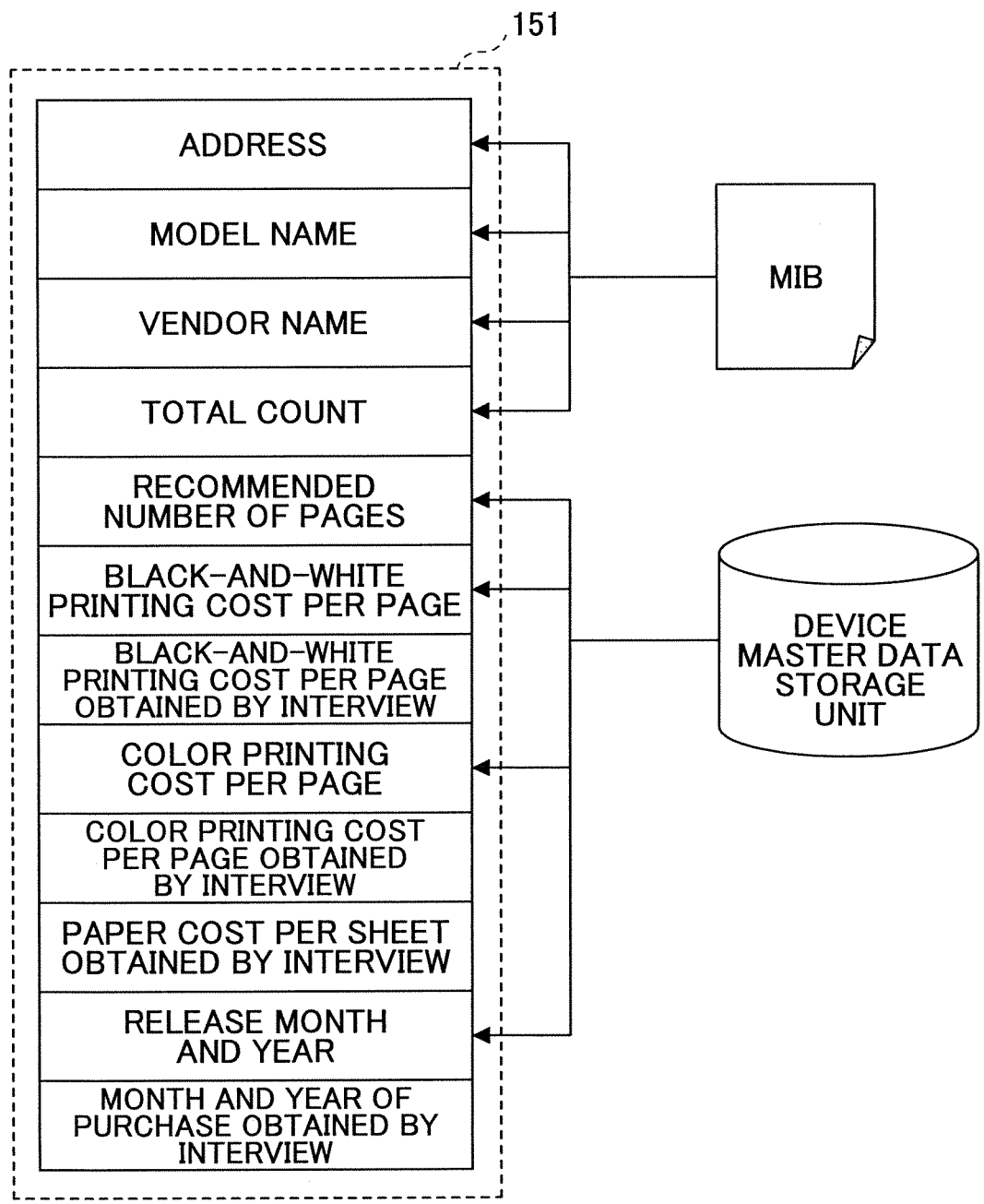
FIG. 9 is a drawing illustrating exemplary network connection status data.

Then, the analysis macro tool 13 generates network connection status data 151 shown in FIG. 9. The network connection status data 151 includes items such as address, model name, vendor name, total count, recommended number of pages, black-and-white printing cost per page, black-and-white printing cost per page obtained by interview, color printing cost per page, color printing cost per page obtained by interview, paper cost per sheet obtained by interview, release month and year, and month and year of purchase obtained by interview. The address, the model name, the vendor name, and the total count are obtained from the MIB information. The recommended number of pages, the black-and-white printing cost per page, the color printing cost per page, and the release month and year are obtained from the device master data.

Figure 10:
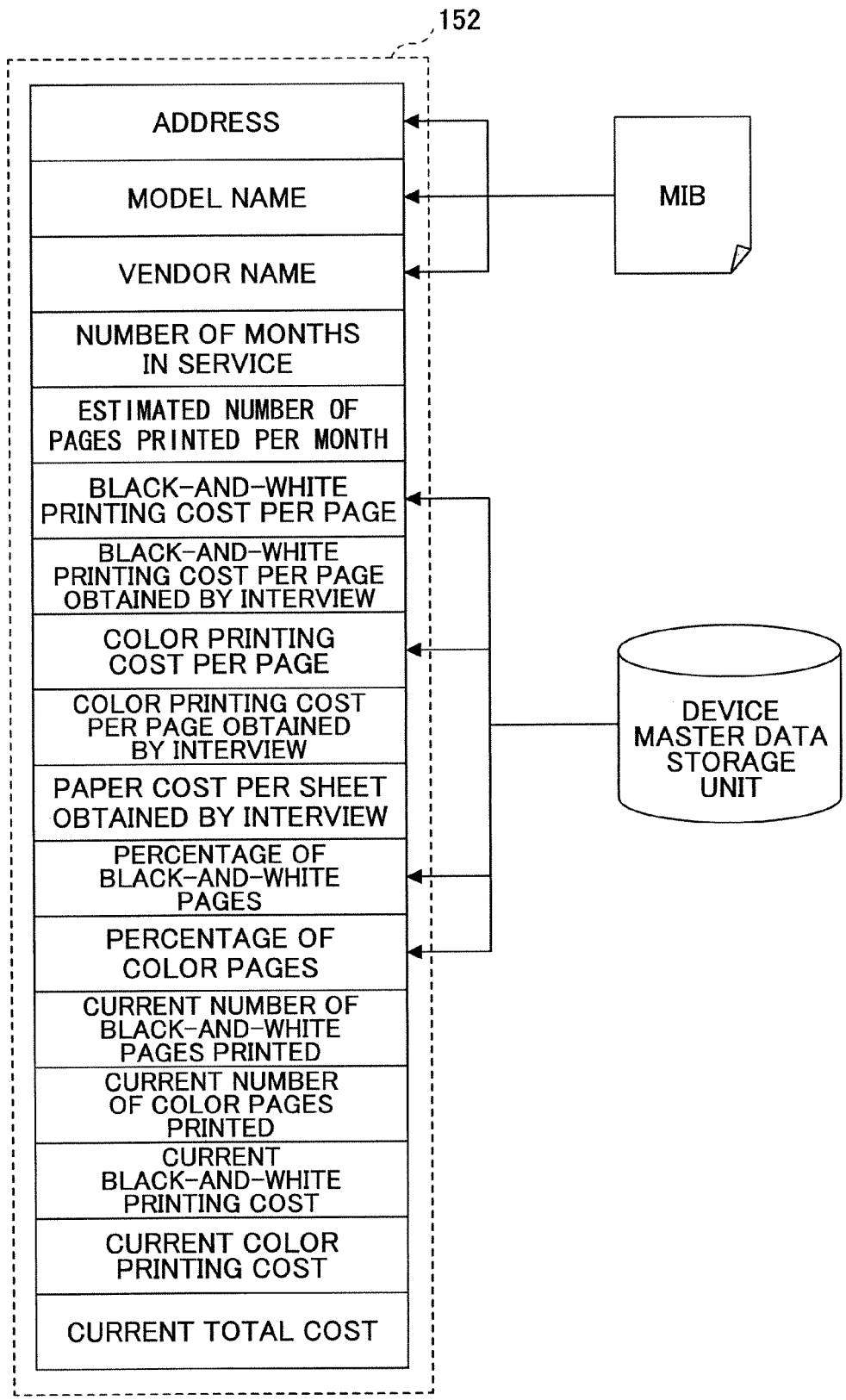
FIG. 10 is a drawing illustrating exemplary cost status data.

Also, the analysis macro tool 13 generates cost status data 152 shown in FIG. 10. The cost status data 152 includes items such as address, model name, vendor name, number of months in service, estimated number of pages printed per month, black-and-white printing cost per page, black-and-white printing cost per page obtained by interview, color printing cost per page, color printing cost per page obtained by interview, paper cost per sheet obtained by interview, percentage of black-and-white pages, percentage of color pages, current number of black-and-white pages printed, current number of color pages printed, current black-and-white printing cost, current color printing cost, and current total cost. The black-and-white printing cost per page, the color printing cost per page, the percentage of black-and-white pages, and the percentage of color pages are obtained from the device master data.

The number of months in service can be calculated from the month and year of purchase obtained by interview and the current month and year. The estimated number of pages printed per month can be calculated by dividing the total count by the number of months in service. The current number of black-and-white pages printed and the current number of color pages printed are calculated by multiplying the estimated number of pages printed per month with the percentage of black-and-white pages and the percentage of color pages, respectively.

Next, the control unit 21 of the client terminal 20 outputs a screen 600 shown in FIG. 11. The screen 600 shows the details of usage status of the network devices and includes a network connection status table 610 and a cost status table 620. As shown in FIG. 12, the network connection status table 610 is generated based on the network connection status data 151. Also, as shown in FIG. 13, the cost status table 620 is generated based on the cost status data 152.

Figure 14:
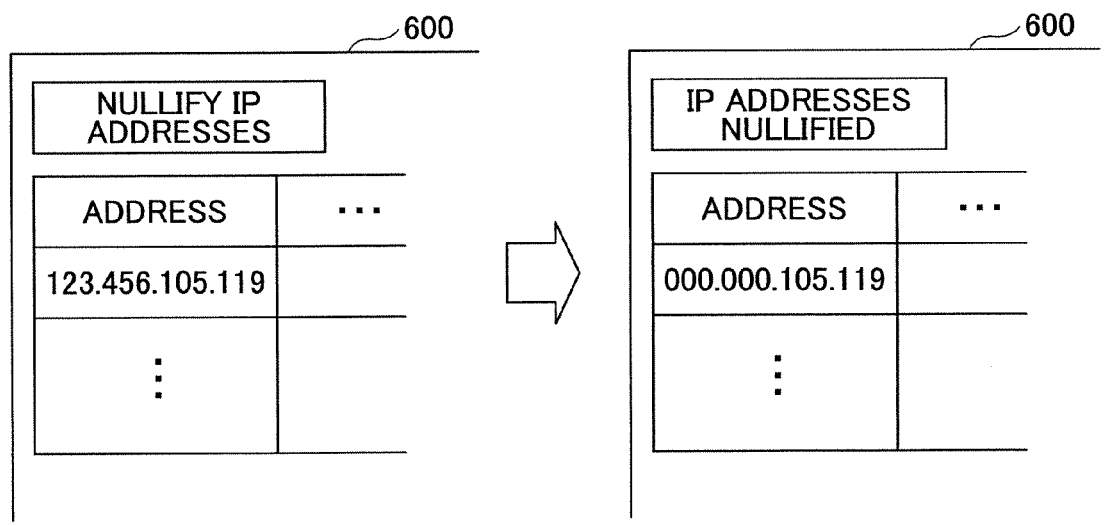
FIG. 14 is a drawing used to describe an exemplary process of nullifying address information.

After generating the network connection status table 610 and the cost status table 620, the control unit 21 nullifies the address information in the tables (step S1-8). For example, as shown in FIG. 14, the control unit 21 replaces high-order digits of the addresses in the network connection status table 610 and the cost status table 620 with 0s and thereby nullifies the address information.

Next, the control unit 21 of the client terminal 20 performs an analysis step (step S1-9). In the analysis step, the control unit 21 of the client terminal 20 performs the sub-steps shown in FIG. 5 using the analysis macro tool 13.

First, the control unit 21 of the client terminal 20 performs an obtained by interview information registration sub-step (step S2-1). In the obtained by interview information registration sub-step, the control unit 21 adds information items obtained by interview and entered in the network connection status table 610 to the network connection status data 151.

Meanwhile, for a network device that is not SNMP-enabled, "Not supported" is displayed in the total count field. In such a case, the total count is entered manually in the network connection status table 610 by using the input unit 23.

The black-and-white printing cost per page obtained by interview and the color printing cost per page obtained by interview are contractual printing prices and obtained by interviewing the client. The paper cost per sheet obtained by interview is the price per sheet of paper used by the client and is obtained by interviewing the client. The month and year of purchase obtained by interview is the month and year of purchase of a network device and is obtained by interviewing the client.

The above information items obtained by interview are entered in the network connection status table 610 and the entered information items are added by the control unit 21 to the network connection status data 151. The control unit 21 also calculates some of the information items in the cost status data 152 as described below. The number of months in service in the cost status data 152 is calculated based on the month and year of purchase obtained by interview in the network connection status table 610. The estimated number of pages printed per month is calculated by dividing the total count by the number of months in service.

The black-and-white printing cost per page obtained by interview, the color printing cost per page obtained by interview, and the paper cost per sheet obtained by interview are automatically obtained from the corresponding values in the network connection status table 610.

For each of the percentage of black-and-white pages and the percentage of color pages, 50% is specified as the initial value. The initial value can be changed as needed. The current number of black-and-white pages printed and the current number of color pages printed are obtained based on the percentage of black-and-white pages and the percentage of color pages.

Next, the control unit 21 of the client terminal 20 performs a running cost confirmation sub-step (step S2-2). The running cost confirmation sub-step is performed to find out disproportionate concentration of print jobs on some of the devices with high printing costs. In the running cost confirmation sub-step, the control unit 21 sorts the devices in descending order of printing costs per page. When the output rate (estimated number of pages printed per month/total estimated number of pages printed per month) of a highly-ranked device is larger than a reference value, the control unit 21 outputs an alarm. In this embodiment, reference values are obtained based on the number of devices in the LAN. For example, the reference value for the first-ranked device is obtained by "2/number of devices" and the reference value for the second-ranked device is obtained by "4/number of devices". When the output rate exceeds the corresponding reference value, the values of the current black-and-white printing cost, the current color printing cost, and the current total cost are displayed in red.

Next, the control unit 21 of the client terminal 20 performs a long-time used device confirmation sub-step (step S2-3). In the long-time used device confirmation sub-step, the control unit 21 identifies devices that are in service more than 30 months and displays the values of the number of months in service of the identified devices in red.

Further, the control unit 21 of the client terminal 20 performs a recommended number of pages confirmation sub-step (step S2-4). In this sub-step, the control unit 21 compares the estimated number of pages printed per month and the recommended number of pages per month. When the estimated number of pages printed per month of a device is larger than the recommended number of pages per month of the device, the control unit 21 displays the value of the estimated number of pages printed per month in red. After completing the above sub-steps, the control unit 21 terminates the analysis step.

The above embodiment has the advantages described below.

As described, in the above embodiment, the USB memory 10 containing the installer 11, the count acquisition tool 12, and the analysis macro tool 13 is used. The USB memory 10 is connected to the client terminal 20 in the client's office to obtain the operational information of devices connected to the client's network. Thus, the USB memory 10 makes it possible to obtain the operational information of devices without connecting an additional computer to the client's network. In other words, the USB memory 10 eliminates the need to carry a computer and thereby makes it possible to efficiently obtain operational information of devices. Also, the above embodiment eliminates the need to configure network settings of a computer each time to obtain the operational information of devices and thereby makes it possible to reduce the workload and time for obtaining the operational information of devices. Further, according to the above embodiment, the client terminal 20 existing in the client's office is used to obtain the operational information of devices. This reduces the security concern to the client.

In the above embodiment, after generating the network connection status table 610 and the cost status table 620, the control unit 21 nullifies the address information in the tables by deleting a part of each of the addresses (step S1-8). For example, the control unit 21 replaces the high-order digits of each of the addresses with 0s. Thus, the above embodiment makes it possible to adequately manage the operational information obtained from devices in the client's office. For example, even when a service person takes the obtained operational information back to his/her office to analyze the operational information in more detail, since the network information (IP addresses) of the client's office is nullified, the information of the client is protected securely.

In the above embodiment, when the "Obtain count" button is clicked on, the integrated device operation management utility 210 installed in the client terminal 20 is started. Then, an entry screen (the screen 530) is displayed to set up conditions for searching for and monitoring target network devices. After the conditions are specified on the screen 530, the SNMP manager implemented by the integrated device operation management utility 210 obtains the information on the target network devices according to the specified conditions. More specifically, the SNMP manager sends ping packets to the target network devices and thereby obtains the information in the MIBs of the target network devices. Thus, the above embodiment makes it possible to efficiently obtain device information using the conventional SNMP protocol.

Also, since the above embodiment obtains device information via a network, it is possible to obtain the information on devices connected to a remote network. Further, the above embodiment makes it possible to obtain operational information on devices having specified IP addresses.

In the above embodiment, the USB memory 10 is connected to the external interface 24 of the client terminal 20. Then, the authentication step is performed to log into the security area of the USB memory 10 (step S1-1). This authentication step improves the information security.

In the above embodiment, the analysis macro tool 13 and the spreadsheet program 22 are used for the analysis step. The analysis step includes the running cost confirmation sub-step (step S2-2), the long-time used device confirmation sub-step (step S2-3), and the recommended number of pages confirmation sub-step (step S2-4). These sub-steps make it possible to grasp the operational status of electronic devices connected to a client's network and to propose a plan to reduce the total cost of ownership.

The above embodiment may also be implemented as described below.

In the above embodiment, the USB memory 10 containing the installer 11, the count acquisition tool 12, the analysis macro tool 13 is used to obtain operational information of devices. However, any recording medium other than a USB memory may be used as long as information security can be ensured.

In the above embodiment, the spreadsheet program 22 in the client terminal 20 is used for the analysis step. However, the spreadsheet program 220 may be installed in the USB memory 10. Also, the spreadsheet program 220 in another computer may be used for the analysis step. In this case, the device information stored in the device information storage unit 15 may be supplied to the spreadsheet program 220 by connecting the USB memory 10 to the other computer.

In the above embodiment, the control unit 21 of the client terminal 20 outputs the screen 600. The screen 600 includes the network connection status table 610 and the cost status table 620 that show the detailed operational information on devices and are used for analyzing the operational information. For the analysis of the operational information, a layout chart may also be used. For example, the layout chart of devices in the client's network is prepared and corresponding IP addresses are mapped onto the devices. The total count or the number of output pages of each of the devices in an area specified on the layout chart is obtained. Together with a table containing device names associated with suitable numbers of output pages, the layout chart may be used to recommend replacement devices.

Embodiments of the present invention provide a device information acquisition apparatus and a device information acquisition program that make it possible to efficiently obtain operational information on devices connected to a network in an office of a client, thereby to calculate a total cost of ownership of the devices, and to adequately manage the obtained operational information. Embodiments of the present invention thereby make it possible to reduce the workload for obtaining the operational information on devices and to improve the information security.

The present invention is not limited to the specifically disclosed embodiments, and variations and modifications may be made without departing from the scope of the present invention.

The present application is based on Japanese Priority Application No. 2006-036552, filed on Feb. 14, 2006, the entire contents of which are hereby incorporated herein by reference.

What is claimed is:

1. A portable apparatus that is connectable to a client terminal connected to a network, the portable apparatus comprising:
   a program for causing the client terminal, including a processor, to function as a device information acquisition unit and an analysis unit, and
   a device master data storage unit retaining attribute information of devices, the attribute information being associated with model identifiers of the devices, wherein
   the processor, as the device information acquisition unit, obtains a model identifier and operational information from a device that is assigned a network IP address and connected to the network, and
   the processor, as the analysis unit, replaces, with 0s, at least a part of digits of the network IP address assigned to the device in IP address information that is obtained together with the operational information, extracts the attribute information of the device from the device master data storage unit based on the obtained model identifier, analyzes the obtained operational information by using the extracted attribute information, and outputs results of the analysis of the operational information.

2. The portable apparatus as claimed in claim 1, further comprising:
   a security area accessible by password authentication and including a device information storage unit that stores the operational information obtained by the device information acquisition unit.

3. The portable apparatus as claimed in claim 1, wherein
   the processor, as the device information acquisition unit, retains data on a specified range of one or more network addresses, obtains the network address of the device, and requests the operational information from the device when the obtained network address is included in the specified range of one or more network addresses.

4. A portable apparatus having a program stored therein for causing a client terminal, including a processor, connected to a network to obtain and analyze operational information on a device that is assigned a network IP address and connected to the network, wherein the processor executes the program to perform steps comprising:
   storing, at a device master data storage unit, attribute information of devices, the attribute information being associated with model identifiers of the devices;
   obtaining, as a device information acquisition code unit, a model identifier and the operational information from the device;
   replacing, as an analysis code unit, with 0s, at least a part of digits of the network IP address assigned to the device in IP address information that is obtained together with the operational information;
   extracting the attribute information of the device from the device master data storage unit based on the obtained model identifier;
   analyzing the operational information by using the extracted attribute information; and
   outputting results of the analysis of the operational information.

5. The portable apparatus as claimed in claim 4, further comprising:
   a security area accessible by password authentication and including a device information storage unit, wherein
   the processor stores the obtained operational information in the device information storage unit.

6. The portable apparatus as claimed in claim 4, wherein the processor further performs steps comprising:

retaining data on a specified range of one or more network addresses;

obtaining the network address of the device; and requesting the operational information from the device when the obtained network address is included in the specified range of one or more network addresses.

7. A method for using a portable apparatus to cause a client terminal, including a processor, connected to a network to obtain and analyze operational information on a device that is assigned a network IP address and connected to the network, the method comprising:

storing, at a device master data storage unit, attribute information of devices, the attribute information being associated with model identifiers of the devices;

obtaining, as a device information acquisition code unit, a model identifier and the operational information from the device;

replacing, as an analysis code unit, with 0s, at least a part of digits of the network IP address assigned to the device in IP address information that is obtained together with the operational information;

extracting the attribute information of the device from the device master data storage unit based on the obtained model identifier;

analyzing, as the analysis code unit, the operational information by using the extracted attribute information; and outputting results of the analysis of the operational information.

8. The method according to claim 7, further comprising:
storing, via the processor, the obtained operational information in a device information storage unit of the portable apparatus, the device information storage unit being a secure area accessible by password authentication.

9. The method according to claim 7, further comprising:
retaining data on a specified range of one or more network addresses;

obtaining the network address of the device; and requesting the operational information from the device when the obtained network address is included in the specified range of one or more network addresses.

10. The portable apparatus as claimed in claim 1, wherein the processor, as the analysis unit, compares a cost of operating the device that is assigned the network IP address and connected to the network to a cost of operating each of a plurality of different devices connected to the network, and sorts the devices based on the costs of operating each of the devices.

11. The portable apparatus as claimed in claim 1, wherein the processor, as the analysis unit, determines whether the device that is assigned the network IP address and connected to the network has been in operation for more than a predetermined period of time and outputs a result based on the determination.

12. The portable apparatus as claimed in claim 1, wherein the processor, as the analysis unit, compares an estimated number of a predetermined operation to be performed by the device within a specified time period and a recommended number of the predetermined operation to be performed by the device within the specified time period, and outputs a result based on the comparison.

* * * * *